United States Patent
Celo et al.

(10) Patent No.: US 10,353,267 B2
(45) Date of Patent: Jul. 16, 2019

(54) CARRIER-EFFECT BASED OPTICAL SWITCH

(71) Applicants: Dritan Celo, Nepean (CA); Dominic John Goodwill, Ottawa (CA)

(72) Inventors: Dritan Celo, Nepean (CA); Dominic John Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/395,570

(22) Filed: Dec. 30, 2016

(65) Prior Publication Data

US 2018/0188632 A1    Jul. 5, 2018

(51) Int. Cl.
*G02F 1/225* (2006.01)
*G02F 1/313* (2006.01)
(Continued)

(52) U.S. Cl.
CPC .......... *G02F 1/3136* (2013.01); *G02F 1/0147* (2013.01); *G02F 1/025* (2013.01);
(Continued)

(58) Field of Classification Search
None
See application file for complete search history.

(56) References Cited

U.S. PATENT DOCUMENTS

| | | | |
|---|---|---|---|
| 6,181,456 B1 * | 1/2001 | McBrien | G02F 1/0123 359/245 |
| 6,845,198 B2 * | 1/2005 | Montgomery | G02F 1/2257 359/245 |

(Continued)

FOREIGN PATENT DOCUMENTS

| | | |
|---|---|---|
| CN | 101467083 A | 6/2009 |
| CN | 102224444 A | 10/2011 |
| JP | 2016133664 A | 7/2016 |
| WO | 2016029836 A1 | 3/2016 |
| WO | 2016180146 A1 | 11/2016 |

OTHER PUBLICATIONS

International Search Report dated Mar. 26, 2018 for corresponding International Application No. PCT/CN2017/120211 filed Dec. 29, 2017.

*Primary Examiner* — Michael Stahl

(57) ABSTRACT

A carrier-effect based optical switch, a method of operating the carrier-effect based switch, and a controller module for controlling a carrier-effect based optical switch are provided. The carrier-effect based optical switch comprises input and output optical couplers, first and second optical waveguide arms each connecting the input optical coupler to the output optical coupler, a first junction diode proximate to the first optical waveguide arm for providing a first optical phase delay thereto due to at least a carrier-based effect, and a first resistive heater proximate to the second optical waveguide arm for providing a second optical phase delay thereto due to a thermo-optic effect. The method comprises applying a first electrical power to the first junction diode for providing a first optical phase delay thereto due to at least a carrier-based effect, and applying a second electrical power to the first resistive heater for providing a second optical phase delay thereto due to at least a carrier-based effect. The controller module comprises code which, when executed on a computing device, causes the controller module to perform the method.

19 Claims, 14 Drawing Sheets

(51) Int. Cl.
*G02F 1/025* (2006.01)
*G02F 1/01* (2006.01)

(52) U.S. Cl.
CPC ............ *G02F 1/225* (2013.01); *G02F 1/2257* (2013.01); *G02F 1/3133* (2013.01); *G02F 2202/10* (2013.01); *G02F 2203/21* (2013.01); *G02F 2203/50* (2013.01)

(56) References Cited

U.S. PATENT DOCUMENTS

| | | | | |
|---|---|---|---|---|
| 7,447,395 B2* | 11/2008 | Montgomery | ........... | G02F 1/025 385/14 |
| 7,715,732 B2* | 5/2010 | Koh | ........... | G02F 1/0123 359/237 |
| 7,903,981 B2* | 3/2011 | Cho | ........... | G02F 1/0123 398/183 |
| 2004/0223677 A1* | 11/2004 | Park | ........... | G02B 6/1221 385/1 |
| 2005/0271315 A1* | 12/2005 | Gan | ........... | G02F 1/025 385/8 |
| 2009/0110342 A1 | 4/2009 | Webster et al. | | |
| 2011/0135243 A1 | 6/2011 | Park et al. | | |
| 2011/0229070 A1* | 9/2011 | Doi | ........... | G02F 1/225 385/3 |
| 2014/0334764 A1 | 11/2014 | Galland et al. | | |
| 2015/0293427 A1* | 10/2015 | Goi | ........... | G02F 1/025 385/3 |
| 2016/0246157 A1* | 8/2016 | Dumais | ........... | G02F 1/2257 |
| 2016/0266414 A1* | 9/2016 | Gill | ........... | G02F 1/011 |
| 2017/0285436 A1* | 10/2017 | Hochberg | ........... | G02F 1/2257 |
| 2017/0293200 A1* | 10/2017 | Jiang | ........... | G02F 1/3136 |
| 2017/0315424 A1* | 11/2017 | Celo | ........... | G02F 1/3136 |

* cited by examiner

1100

```
┌─────────────────────────────────────────────┐
│ Apply a first electrical power to a first junction diode │
│ disposed proximate to a first optical waveguide arm     │
│ in a carrier-effect based optical switch                │
│                                                    1110 │
└─────────────────────────────────────────────┘
                        │
                        ▼
┌─────────────────────────────────────────────┐
│ Apply a second electrical power to a first resistive    │
│ heater disposed proximate to a second optical           │
│ waveguide arm in the carrier-effect based optical switch│
│                                                    1120 │
└─────────────────────────────────────────────┘
```

CARRIER-EFFECT BASED OPTICAL SWITCH

FIELD OF THE INVENTION

The present invention pertains to the field of network communications, and in particular to a carrier-effect based optical switch.

BACKGROUND

Photonic switches are increasingly used to switch signals in optical networks. A photonic switch may be based on a Mach-Zehnder interferometer (MZI) with a carrier-effect based phase shifter in one or both arms of the MZI. A carrier-effect based phase shifter is typically based on a positive (p-type)-intrinsic (i-type)-negative (n-type) (i.e., PIN), or positive (p-type)-negative (n-type) (i.e., PN), electrical diode. These types of switch structures are known as push-only (PIN or PN diode in one arm) or push-pull (PIN or PN diode in both arms) configurations. An MZI with integrated carrier-effect based phase shifters can provide a compact and low power optical switch having sufficiently fast switching speed for use in metro networks and data center switching applications. Further, the carrier-based optical switches or "switching cells" can be successfully used to construct larger-scale switch fabrics, allowing on-chip integrated optical switch matrices of large size (e.g., 64×64) to be fabricated.

Carrier-effect based phase shifters are susceptible to a self-heating effect caused by electrical power (Joule heating) dissipated mainly in the intrinsic region of a PIN or in the junction region of a PN diode operating under steady-state condition. As a result, a self-heating effect takes place in one of the MZI arms. It increases the operational temperature at this arm and also creates a temperature gradient across the structure. This leads to an additional and unwanted phase shift induced in one arm of the MZI and, in turn, degrading the optical extinction ratio of the switch.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved method and apparatus for a carrier-effect based optical switch of a communications network.

In accordance with embodiments of the present invention, there is provided a carrier-effect based optical switch. The carrier-effect based optical switch comprises input and output optical couplers, first and second optical waveguide arms each connecting the input optical coupler to the output optical coupler, a first junction diode proximate to the first optical waveguide arm for providing a first optical phase delay thereto due to at least a carrier-based effect, and a first resistive heater proximate to the second optical waveguide arm for providing a second optical phase delay thereto due to a thermo-optic effect.

In accordance with embodiments of the present invention, there is also provided a method of operating a carrier-effect based optical switch. The method comprises applying a first electrical power to a first junction diode disposed proximate to a first optical waveguide arm of the carrier-effect based optical switch for providing a first optical phase delay thereto due to at least a carrier-based effect, and applying a second electrical power to a first resistive heater disposed proximate to a second optical waveguide arm of the carrier-effect based optical switch for providing a second optical phase delay thereto due to a thermo-optic effect.

In accordance with embodiments of the present invention, there is also provided a controller module for controlling a carrier-effect based optical switch. The controller module comprises code which, when executed on a computing device, causes the controller module to apply a first electrical power to a first junction diode disposed proximate to a first optical waveguide arm of the carrier-effect based optical switch for providing a first optical phase delay thereto due to at least a carrier-based effect, and apply a second electrical power to a first resistive heater disposed proximate to a second optical waveguide arm of the carrier-effect based optical switch for providing a second optical phase delay thereto due to a thermo-optic effect.

BRIEF DESCRIPTION OF THE FIGURES

Further features and advantages of the present invention will become apparent from the following detailed description, taken in combination with the appended drawings, in which:

FIG. 11 illustrates, in a flowchart, an example of a method of operating a carrier-effect based optical switch having a resistive heater;

It will be noted that throughout the appended drawings, like features are identified by like reference numerals.

DETAILED DESCRIPTION

Embodiments of the present invention are directed towards a carrier-effect based optical switch (e.g., a carrier injection optical switch (CIOS)) and a method of operating a carrier-effect based optical switch.

Figure 1:
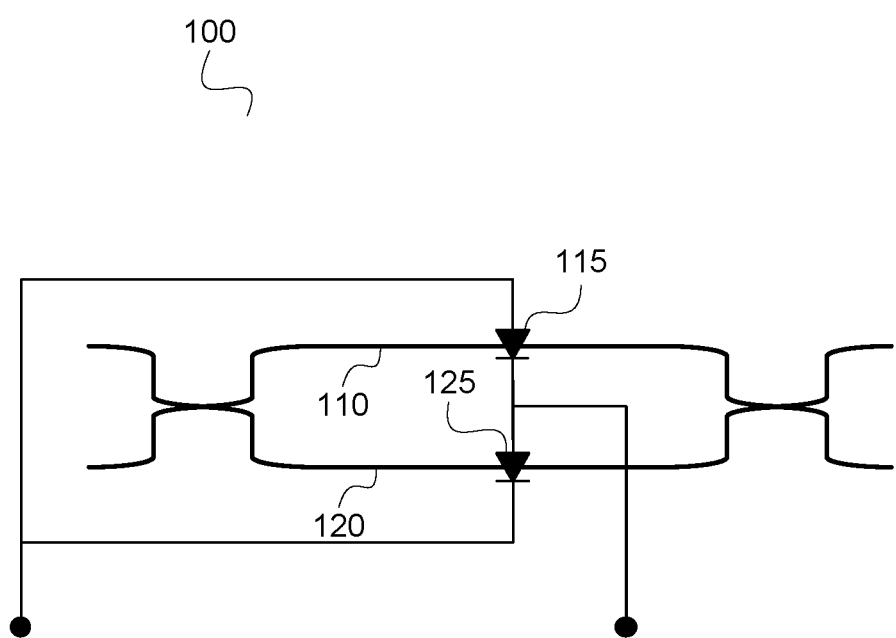
FIG. 1 illustrates, in a schematic diagram, an example of a carrier-effect based optical switch with a push-pull configuration.

FIG. 1 illustrates, in a schematic diagram, an example of a carrier-effect based optical switch 100 with a push-pull configuration. The carrier-effect based optical switch 100 comprises a first optical waveguide arm 110, a first diode 115 proximate to the first optical waveguide arm 110, a second optical waveguide arm 120 and a second diode 125 proximate to the second optical waveguide arm 120. The first and second optical waveguide arms 110,120 form a Mach-Zehnder interferometer (MZI). One example of a carrier-effect based optical switch 100 is a CIOS.

Figure 2:
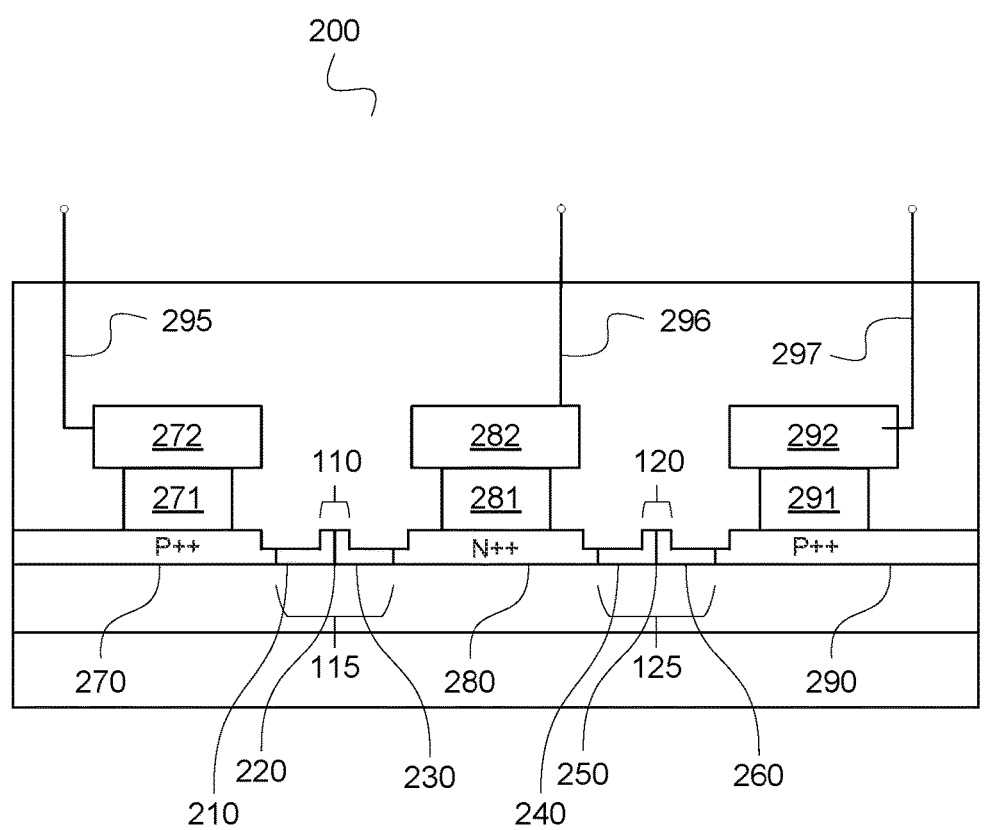
FIG. 2 illustrates, in a component diagram, a cross-sectional view of the carrier-effect based optical switch showing a cross-sectional view of first and second diodes.

FIG. 2 illustrates, in a component diagram, a cross-sectional view of the carrier-effect based optical switch 100 showing a cross-sectional view of the first and second diodes 115,125. The first optical waveguide arm 110 is located between a first p-type (P+) region 210 and a first n-type (N+) region 230 (i.e., forming the first junction diode 115). The region between the first P+ region 210 and the first N+ region 230 may be referred to as the first junction region 220. If the first P+ region 210 and the first N+ region 230 are separated by an intrinsic (i-type) region, then a PIN junction diode is formed. If the first P+ region 210 and the first N+ region 230 are not separated by an intrinsic (i-type) region, then a PN junction diode is formed. The second optical waveguide arm 120 is located between a second n-type (N+) region 240 and a second p-type (P+) region 260 (i.e., forming the second junction diode 125). The region between the second P+ region and the second N+ region may be referred to as the second junction region 250. The first P+ region (lightly doped region) 210 is coupled to a first P++ region (heavily doped region) 270. The first N+ region (lightly doped region) 230 is coupled to an N++ region (heavily doped region) 280. Similarly, the second N+ region 240 is coupled to the N++ region 280 and the second P++ region 260 is coupled to a second P++ region 290.

Each region P++ 270, N++ 280, P++ 290 with low ohmic resistance serves as a contact area between a via 271,281, 291 comprising low-resistance metal and the active layer (e.g., silicon layer in an silicon on insulator (SOI) stack). The via regions 271,281,291 are connected to metal traces 272,282,292, respectively. The metal traces 272,282,292 may be aluminium, copper, or any metal used in a fabrication process to create an electrical connection. A first wire or trace 295 having a terminal end is connected to the left metal trace 272 over the first P++ region 270, a second wire or trace 296 having a terminal end is connected to the middle metal trace 282 over the N++ region 280, and a third wire or trace 297 having a terminal end is connected to the right metal trace 292 over the P++ region 290. When voltage is applied between the first wire or trace 295 and the second wire or trace 296, an electric field is created over the first junction region 220 of the first optical waveguide arm 110 between the first P+ region 210 and the first N+ region 230. This electric field modifies the carrier concentration in the first intrinsic region 220 which, in turn, changes the refractive index of the first optical waveguide arm 110. The change in refractive index causes a change in the phase (i.e., an optical phase delay) of an optical signal propagating through the first optical waveguide arm 110. Similarly, when a voltage is applied between the third wire or trace 297 and the second wire or trace 296 (or in an alternative implementation a fourth wire or trace having a terminal end may be connected to the metal trace 282 over the N+ region 280), an electric field is created over the second junction region 250 of the second optical waveguide arm 120 between the second P+ region 260 and the second N+ region 240. This electric field modifies the carrier concentration in the second intrinsic region 250 which, in turn, changes the refractive index of the second optical waveguide arm 120. The change in refractive index causes a change in the phase (i.e., an optical phase delay) of an optical signal propagating through the second optical waveguide arm 120.

Figure 3A:
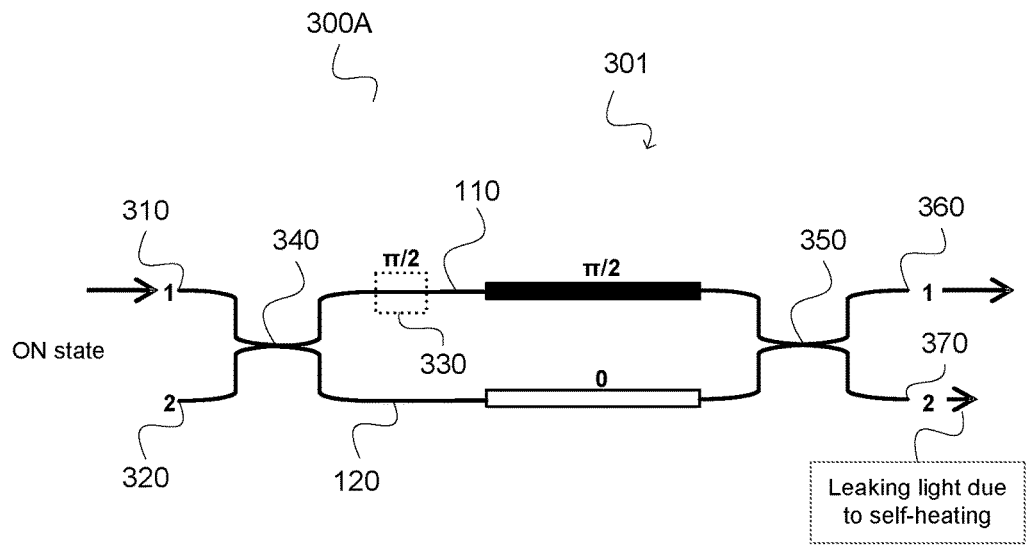
FIGS. 3A and 3B each illustrate a waveguide Mach-Zehnder (MZ) interferometer in ON and OFF states.
Figure 3B:
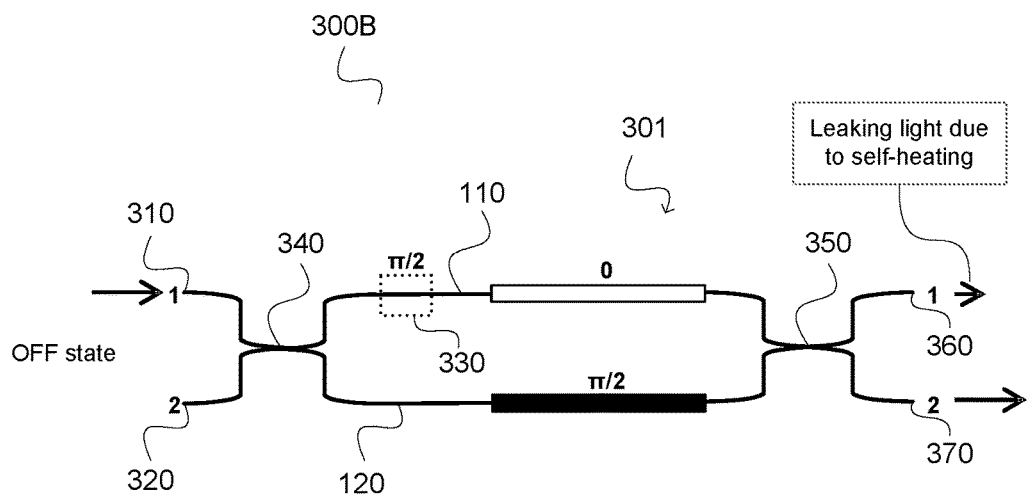

FIGS. 3A and 3B each illustrate a waveguide Mach-Zehnder (MZ) interferometer 301 in ON (300A) and OFF (300B) states. The MZ interferometer 301 includes the first 110 and second 120 arms joined at input 340 and output 350 couplers. The input coupler 340 has first 310 and second 320 input ports, and the output coupler 350 has first 360 and second 370 output ports. Optionally, a thermo-optic direct current (DC) bias element 330 may be added over one of the optical waveguide arms 110, 120 (in this example, the first optical waveguide arm 110) after the input coupler 340. The thermo-optic DC bias element 330 may be configured to compensate for inequality of length of the waveguide arms 110, 120. An optical signal in the optical waveguide arm 110 is delayed by the DC bias element 330 to exactly match the delay in the second waveguide arm 120.

An optical signal entering the first input port 310 is split by the input coupler 340 into two signals of substantially equal magnitude propagating in the first 110 and second 120 waveguide arms. When an electrical current is applied to the metal traces 272,282 (FIG. 2), the optical signal portion propagating in the first waveguide arm 110 (FIG. 3A) will be delayed in phase by $\pi/2$, which results in the optical signal exiting the first output port 360. This is shown as the "ON" state in FIG. 3A. When an electrical current is applied to the metal traces 292,282, optical signal portion propagating in the second waveguide arm 120 (FIG. 3B) will be delayed in phase by $\pi/2$, which results in the optical signal exiting the second output port 370. This is shown as the "OFF" state in FIG. 3B. In either state, there may be leakage of light due to imperfect phase balancing caused by self-heating of the p-n junctions of the first 115 or second 125 diodes. When electrical power is applied to a diode corresponding to an optical waveguide arm 110,120 that arm is termed herein "active" arm. When electrical current is not applied to a diode corresponding to an optical waveguide arm 110,120 that arm is termed herein a "passive" arm.

The carrier-effect based optical switch 100 described in FIGS. 1 to 3B has a push-pull configuration. In other embodiments, a push-only (or pull-only) configuration may be used with only one diode. In the push-only configuration, there may be a single junction diode located proximate to one of the optical waveguide arms. The "ON" state in a single diode configuration occurs when a current flows through that diode. The "OFF" state in a single diode configuration occurs when no current flows through that diode.

Figure 4A:
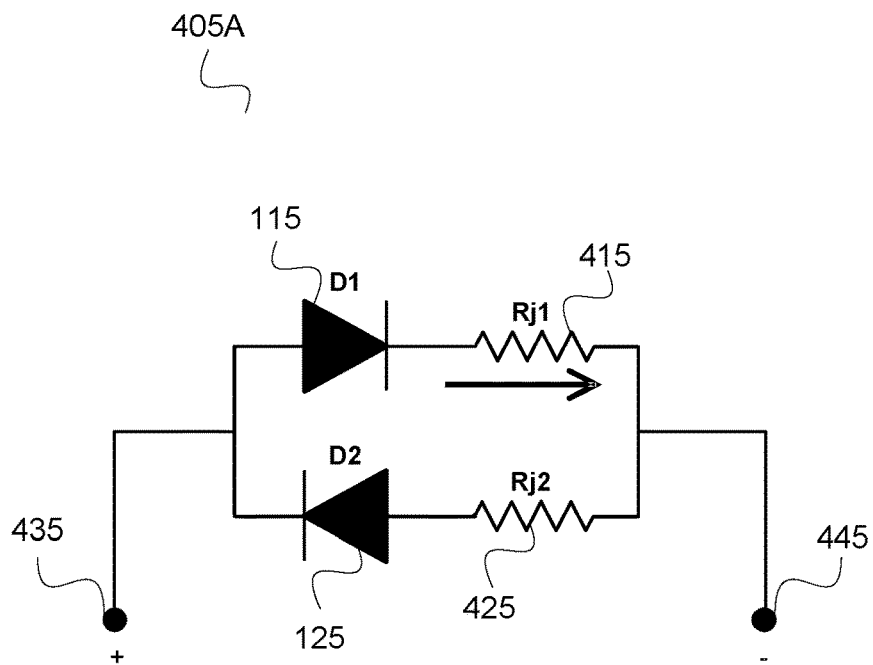
FIGS. 4A and 4B illustrate equivalent electrical circuits of the carrier-effect based optical switch.
Figure 4B:
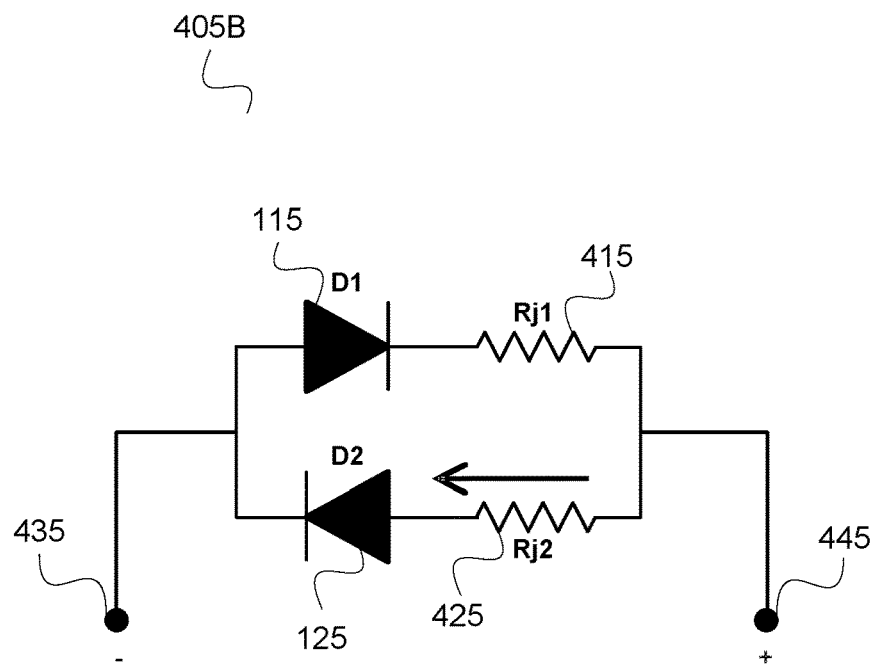

FIGS. 4A and 4B illustrate equivalent electrical circuits 405A,405B of the carrier-effect based optical switch 100. The first diode (D1) 115 has a first junction resistance (Rj1) 415 and the second diode (D2) 125 has a second junction resistance (Rj2) 425. It is noted that while the junction resistances 415,425 are shown separately in FIGS. 4A and 4B, these junction resistances are inherent to the corresponding diodes 115,125 and are shown separately only to facilitate the forthcoming explanation. The electrical circuits 405A,405B have a first terminal 435 and a second terminal 445. When electrical power is applied to the electrical circuit 405A through D1 115 (i.e., the first terminal 435 is positive and the second terminal 445 is negative), the carrier-effect based optical switch is in the "ON" state. When electrical power is applied to the electrical circuit 405B through D2 125 (i.e., the second terminal 445 is positive and the first terminal 435 is negative), the carrier-effect based optical switch is in the "OFF" state.

Resistive heat is generated in the diodes 115,125 when electrical current flows through the corresponding junction resistances 415 and 425. The resistive heat has an undesired, secondary effect on the corresponding optical waveguide arm 110,120. When using a junction diode to change the refractive index of one optical waveguide arm for providing the corresponding optical phase delay due to carrier effect, the resistive heat causes an additional phase shift resulting in an additional, unintended, optical phase delay component to the intended optical phase delay. The additional optical phase delay component reduces the extinction ratio of the optical switch. The extinction ratio of the optical switch 100 decreases since the optical signals in the first and second waveguide arms are no longer correctly phase balanced. The reduced extinction ratio increases undesired leaking of optical signals being switched by the switch 100, causing signal crosstalk. This problem is further exacerbated when a number of carrier-effect based optical switch elements are interconnected in a matrix switch.

Figure 5:
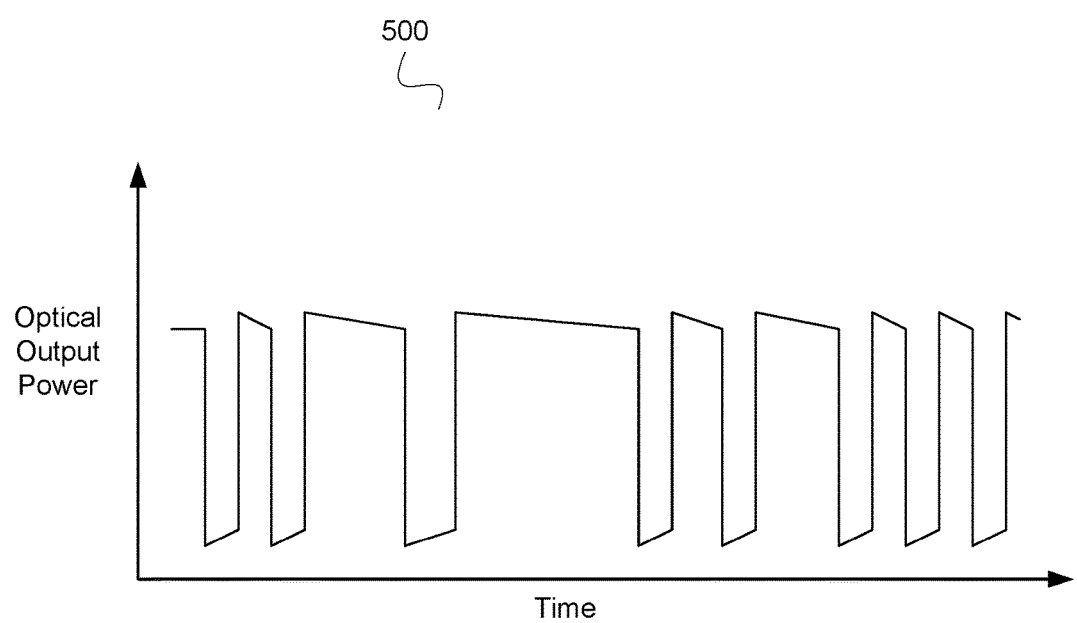
FIG. 5 illustrates a plot of optical output power over time of an optical signal propagating through the carrier-effect based optical switch.

FIG. 5 illustrates a plot of output optical output power over time 500 of an optical signal propagating through the carrier-effect based optical switch 100. The graph 500 shows that the self-heating causes baseline drift resulting in a gradual reduction of ON/OFF extinction ratio (ER). The graph also demonstrates that the carrier-effect based optical switch 100 may only support DC-balanced frame sequences with short hold times. FIG. 5 is an illustration only and is not intended to be to scale.

The above described extinction ratio drift is caused by a time-dependent temperature gradient across the structure caused by resistive heating. One of the parameters that affects the temperature gradient $\Delta T$ is distance between the MZI arms (i.e., $\Delta T$ increases with distance). Designing for reduced distance between arms may help reduce $\Delta T$, but does not eliminate $\Delta T$, as the distance between arms may not be reduced to zero. Furthermore, trying to alleviate the self-heating by putting the CIOS arms close to each other may cause the diode resistance to become too high and the waveguide arm dimensions too small to manufacture CIOS with high yield.

An acceptable temperature difference between the first and second waveguide arms 110,120 is inversely proportional to the length of the waveguide arms. An undesired thermo-optic optical phase change may be defined as the optical phase change induced in the first waveguide arm 110 due to a rise in temperature of the first waveguide arm 110 minus the optical phase change induced in the second waveguide arm 120 due to a rise in temperature of the second waveguide arm 120. Ideally, the undesired thermo-optic optical phase change should be no more than a small fraction of one wavelength (typically ¹⁄₄₀ of a wavelength), such that the contrast ratio between the two outputs of the device is degraded by no more than a few dB. A typically acceptable degradation in contrast ratio is from 25 dB to 22 dB.

A typical silicon photonic carrier-injection switch (i.e., an example of a carrier-effect based optical switch) may have, for example, waveguide arm lengths of 1 mm, an operating wavelength of 1550 nm, and a thermo-optic coefficient of $1.5 \times 10^{-4}$/° C. A temperature difference of approximately 0.25° C. between the two waveguide arms would create an undesirable thermo-optic optical phase change of approximately ¹⁄₄₀ of a wavelength. In a typical device, a difference in power dissipation of approximately 1.5 mW between the first and second waveguide arms 110,120 is sufficient to create this temperature difference. A typical device requires approximately 3 mA at 1 Volt to drive the carrier-injection effect, which is 3 mW. Hence, a typical carrier-effect based optical switch has twice the acceptable temperature difference between the waveguide arms, and needs to be reduced for improved performance.

It is noted that for simplicity of description, the temperature rise is assumed to be the same at every point on a given waveguide arm. However, in typical devices, the temperature rise may vary along the length of the waveguide arms (for example, the waveguide arm may be hottest half-way along). In this situation, the optical phase change would be the integral of the optical phase change along the length of the respective arm.

Figure 6:
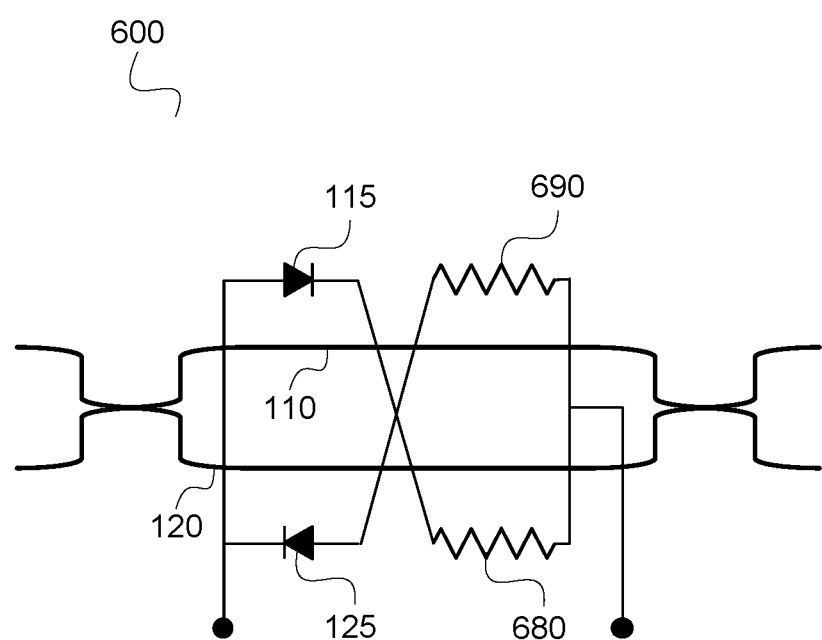
FIG. 6 illustrates, in a schematic diagram, a carrier-effect based optical switch with thermal compensation for self-heating effect on integrated carrier-based phase shifters, in accordance with an embodiment of the present disclosure.

FIG. 6 illustrates, in a schematic diagram, a carrier-effect based optical switch 600 with thermal compensation for self-heating effect on integrated carrier-based phase shifters, in accordance with an embodiment of the present disclosure. The carrier-effect based optical switch 600 comprises all the elements of the carrier-effect based optical switch 100. The carrier-effect based optical switch 600 further includes a first resistive heater RH1 680 proximate to the second optical waveguide arm 120. The RH1 680 is electrically connected in series with the first diode 115. The carrier-effect based optical switch 600 may further include a second resistive heater RH2 690 proximate to the first optical waveguide arm 110. The RH2 690 is electrically connected in series with the second diode 125. The resistive heaters 680, 690 may be resistors or any other suitably sized electrical elements capable of producing heat upon conducting an electrical current. Herein and throughout the rest of the specification, the term "resistive heater" is understood to mean any heater that can increase the temperature of a corresponding waveguide upon application of electrical power (i.e. voltage or current) to the heater, without introducing free carriers into the waveguide.

Preferably, the resistive heaters 680,690 are connected in series with their corresponding diode 115,125, so that the same amount of current will flow through both the diode (i.e., proximate to the active arm) and the resistive heater (i.e., proximate to the passive arm). That is, when electrical power is applied to the diode 115,125, the current that passes through that diode 115,125 will then pass through the respective resistive heater 680,690. Preferably, the resistive heater 680,690 is selected to have a comparable thermal time constant to that of an intrinsic region of a respective PIN diode. This may simplify the electronic circuitry used to control the carrier-effect based optical switch 600. Alternatively, separate power sources may apply electrical power separately to each of the diode 115,125 and corresponding resistive heater 680,690. In this scenario, the electrical power applied to the resistive heater 680,690 is adjusted relative to the electrical power applied to the junction resistance Rj1,Rj2 of the corresponding diode 115,125.

Ideally, the amount of electrical power applied to the first resistive heater 680 will generate enough heat to cause an increase in the temperature of the second waveguide arm 120 by the same (or close to the same) amount as the increase in temperature of the first waveguide arm 110 caused by the heat generated by the junction resistance of the first diode 115. In one embodiment, the difference in temperature between the two waveguide arms due to the heat caused by the first junction resistance Rj1 and the first resistive heater 680 is less than 0.25° C., and may even be less than 0.1° C. It should be noted that some beneficial effect may still be obtained with a temperature difference of less than 0.3° C. or even 0.5° C. The increase in temperature of the second waveguide arm 120 will result in an optical phase delay of an optical signal propagating through the second waveguide arm 120. Thus, the increase in temperature of the second waveguide arm 120 will at least partially offset the thermo-optic portion of the optical phase delay in the first waveguide arm 110 caused by the first diode 115. Similarly, the amount of heat generated by the second resistive heater 690 should be set to increase the temperature of the first waveguide arm 110 by the same (or close to the same) amount as the increase in temperature of the second waveguide arm 120 caused by the heat generated by the junction resistance of the second diode 125. In one embodiment, the difference in temperature between the two waveguide arms due to the heat caused by the second junction resistance Rj2 and the second resistive heater 690 is less than 0.25° C., and even may be less than 0.1° C. As noted above, some beneficial effect may still be obtained with a temperature difference of less than 0.3° C. or even 0.5° C. The increase in temperature of the first waveguide arm 110 will result in an optical phase delay of an optical signal propagating through the first waveguide arm 120. Thus, the increase in temperature of the first waveguide arm 120 will at least partially offset the thermo-optic portion of the optical phase delay in the second waveguide arm 110 caused by the second diode 115.

Figure 7:
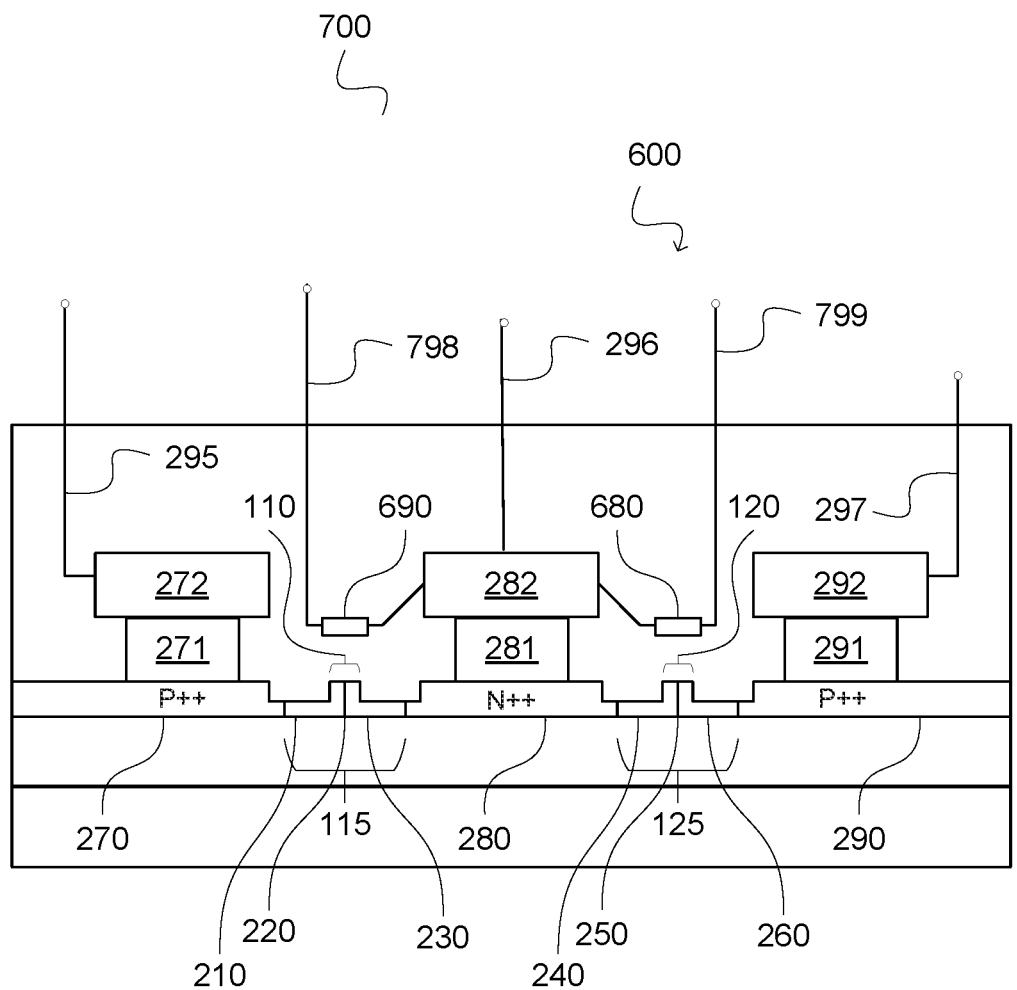
FIG. 7 illustrates, in a component diagram, a cross-sectional view of the carrier-effect based optical switch having the diodes and resistive heaters.

FIG. 7 illustrates, in a component diagram, a cross-sectional view 700 of the carrier-effect based optical switch 600 having the diodes 115,125 and resistive heaters RH1 680 and RH2 690. The difference between carrier-effect based optical switch 100 and carrier-effect based optical switch 600 is the addition of the resistive heaters 680,690 and a corresponding fourth 798 and fifth 799 wire or trace. Monolithically integrated resistive heaters 680,690 may be integrated in a standard complementary metal-oxide-semiconductor (CMOS) photonic fabrication process using commercially available foundries. In this view 700, the first resistive heater 680 is electrically connected in series to the first junction diode 115 such that current that passes through the junction diode 115 also passes through the first resistive heater 680. The first resistive heater 680 is placed proximate to the second optical waveguide arm 120 such that any heat generated by the first resistive heater 680 will change the temperature of the second optical waveguide arm 120. By placing a suitable resistive heating element proximate to the second optical waveguide arm 120, the thermo-optic phase change of the second optical waveguide arm 120 should change approximately the same amount as the thermo-optic phase change in the first optical waveguide arm 110 caused by the heat generated by the first junction diode 115. Thus, the difference in the thermo-optic phase change between the two waveguide arms will be at least partially compensated, which will protect the extinction ratio of the carrier-effect based optical switch 600 from the level of degradation that the carrier-effect based optical switch 100 suffers. In one embodiment, the degradation in contrast ratio between the outputs of the two arms in the carrier-effect based optical switch 600 is less than approximately 3 dB.

Similarly, for push-pull carrier-effect based optical switches, a second resistive heater 690 is electrically connected in series to the second junction diode 125 such that current that passes through junction diode 125 also passes through the second resistive heater 690. The second resistive heater 690 is placed proximate to the first optical waveguide arm 110 such that any heat generated by the second resistive heater 690 will change the temperature of the first optical waveguide arm 110. By placing a suitable resistive heating element proximate to the first optical waveguide arm 110, the thermo-optic phase change of the first optical waveguide arm 110 should change approximately the same amount as the thermo-optic phase change in the second optical waveguide arm 120 caused by heat generated by the second junction diode 125. Thus, the difference in the thermo-optic phase change between the two waveguide arms will be at least partially compensated, which will improve the extinction ratio of the carrier-effect based optical switch 600 as compared to the carrier-effect based optical switch 100.

The resistive heater region 680,690 may be in a region of the waveguide arm that is either within or outside the carrier injection region 115,125. In order for the temperature increase in the passive waveguide arm to equal (or be very close to) the temperature increase in the active waveguide arm, the amount of electrical power applied to the resistive heaters 680,690 may need to be more than the electrical power applied to the diodes 115,125. This is because the resistive heaters 680,690 are a distance away from their respective passive waveguide arms 120,110, while the active waveguide arms 110,120 pass through their respective diodes 115,125. It is to be kept in mind that the optical phase change induced in a thermo-optic device depends on a product of the refractive index delta due to the heating and the length of the waveguide arm portion being heated. Accordingly, the resistive heater region 680,690 may be shorter than the corresponding carrier injection region 115, 125, for as long as it heats the waveguide arm portion to a higher temperature. However, the longer the resistive heater region 680,690, the less power dissipation per unit length will be required to affect the desired compensatory optical phase change. Once an increase in optical phase change in an active waveguide arm attributed to the thermo-optic effect caused by a junction diode is determined, then the length of the resistive heater region 680,690 may be determined to achieve the same optical phase change in the passive waveguide arm.

Figure 8A:
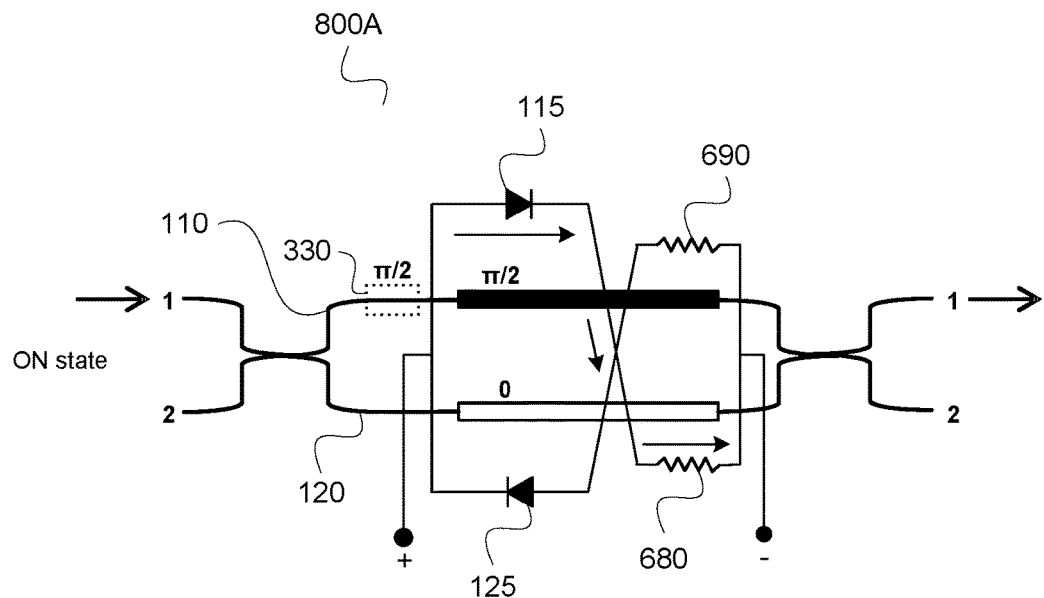
FIGS. 8A and 8B illustrate optical paths in the carrier-effect based optical switch (FIGS. 6 and 7) having resistive heaters.
Figure 8B:
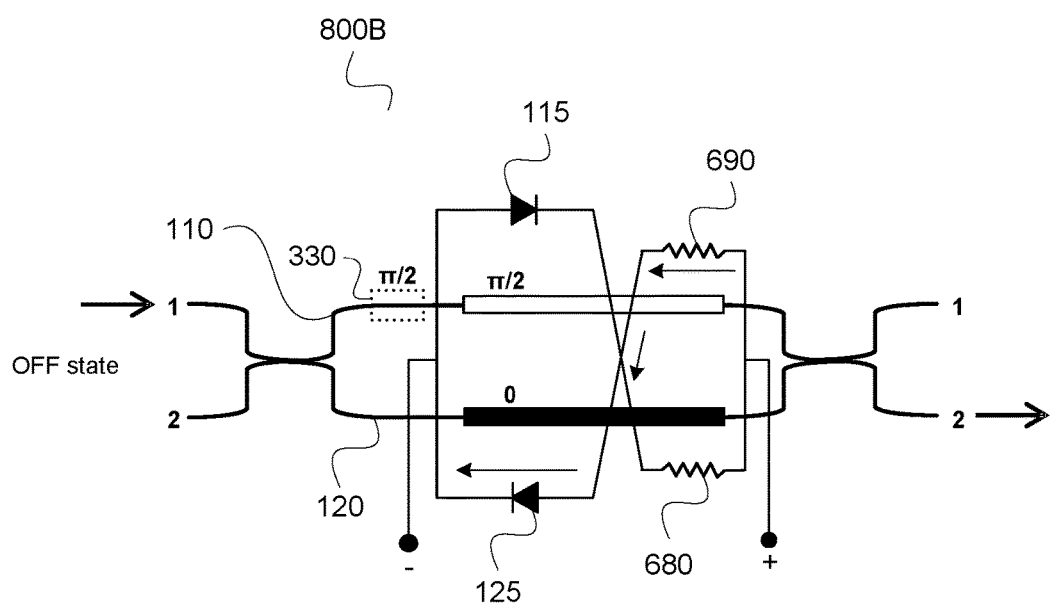
Figure 9A:
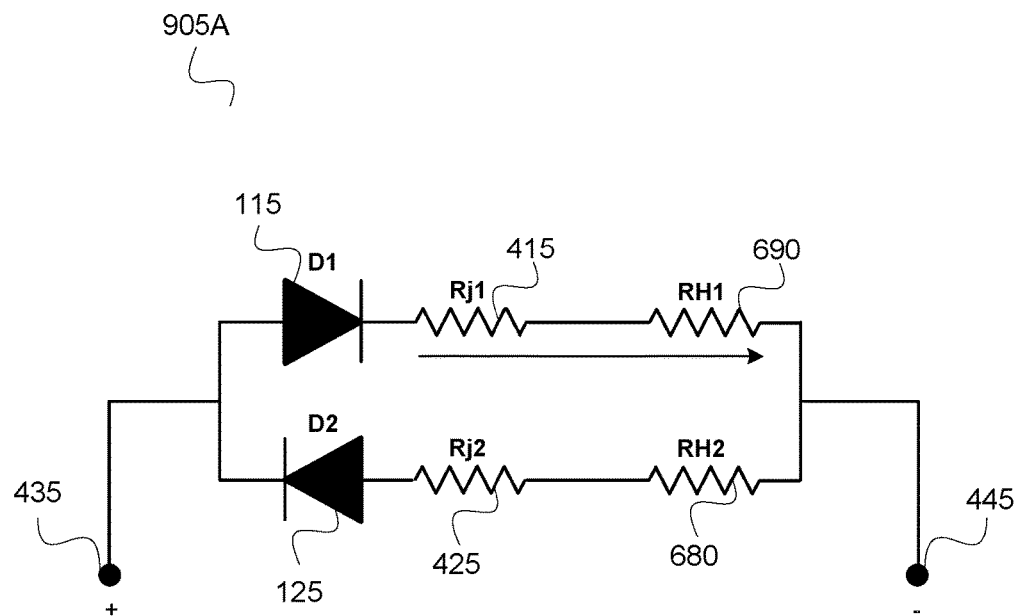
FIGS. 9A and 9B illustrate equivalent electrical circuits of the carrier-effect based optical switch having resistive heaters.
Figure 9B:
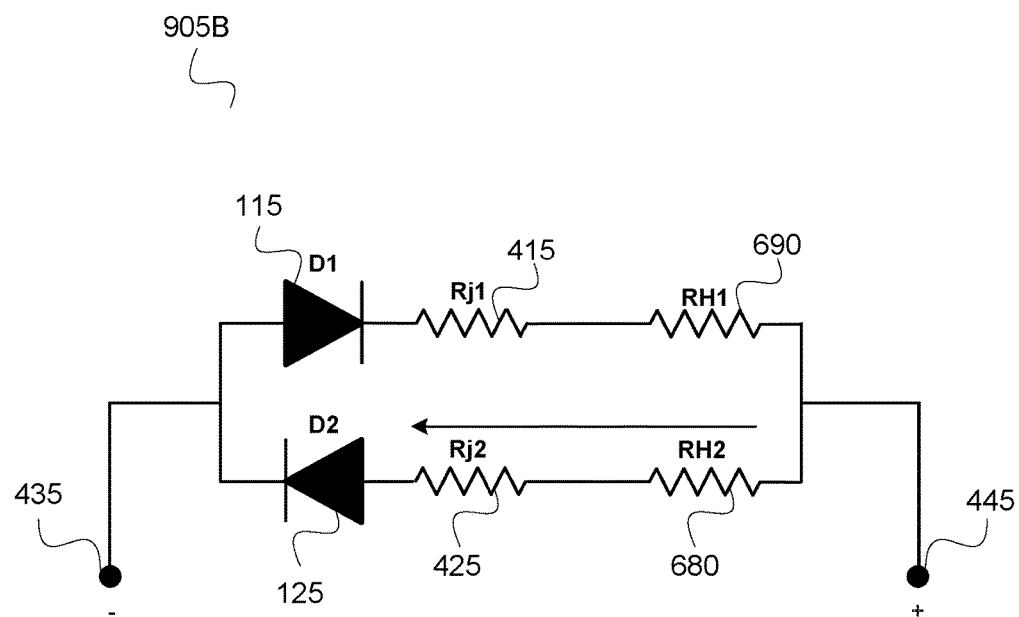

FIGS. 8A and 8B illustrate optical paths 800A,800B in the carrier-effect based optical switch 600 (FIGS. 6 and 7) having resistive heaters RH1 680 and RH2 690. The optical paths 800A (FIG. 8A) and 800B (FIG. 8B) are similar to those shown in FIGS. 3A and 3B with the addition of the resistive heating elements RH1 and RH2. FIGS. 9A and 9B illustrate the equivalent electrical circuits 905A and 905B of the carrier-effect based optical switch 600 having resistive heaters RH1 680 and RH2 690. Again, the difference between these schematic diagrams and those shown in FIGS. 4A and 4B is the inclusion of the resistive heating elements RH1 680 and RH2 690. It is noted that while the junction resistances 415,425 are shown separately in FIGS. 4A, 4B, 9A and 9B, these junction resistances are inherent to the corresponding diodes 115,125 and are not shown separately in other figures. When electrical power is applied to the electrical circuit 905A through D1 115 (i.e., the first terminal 435 is positive and the second terminal 445 is negative), the carrier-effect based optical switch is in the "ON" state. When electrical power is applied to the electrical circuit 905B through D2 125 (i.e., the second terminal 445 is positive and the first terminal 435 is negative), the carrier-effect based optical switch is in the "OFF" state.

A series resistance heater in the passive arm of the MZI consisting of one or two carrier-based phase shifter(s) may consist of one or more electrically conductive, monolithically integrated, metal or semiconductor strip(s) connected in series with the PIN diode on the corresponding active arm. The series resistance heater is preferably located as close as possible to the waveguide on the passive arm to maximize efficiency and reduce the thermal time constant. In one embodiment, the circuit containing a series resistance heater and PIN diode are driven by a same phase shifter drive circuit. Heater material, resistivity, cross section, and length determine the operating resistance of the conductor and rise in temperature (ΔTrise) in the waveguide. The available voltage is dropped across the electrical resistance represented by the series heater in accordance with Ohms law, resulting in a heating effect. Depending on the design and technology, heat generated in the resistive heater can be calculated based on volumetric heat dissipated on the intrinsic region of PIN diode of active arm. Higher resistance in the resistive heater results in low through current and low heat, and less resistance increases the heat output. The self-heating in the diode region of the carrier-based phase shifter can be defined as $P_{diode}=I_{drive}*V_{diode}$, whereas the compensating heat in the resistive heater is defined as $P_{heater}=(I_{drive})^2*R_{heater}$.

The carrier-effect based optical switch 600 described in FIGS. 5 to 9B is a push-pull configuration. Push-only (or pull-only) embodiments of the carrier-effect based optical switch 600 may use one resistive heater (corresponding to one junction diode that may be used).

In a push-only configuration of the carrier-effect based optical switch 600, there may be a single diode (e.g., the first diode 115) proximate to the first optical waveguide arm 110. In this push-only configuration of the carrier-effect based optical switch 600, a single resistive heater (e.g., RH 680) may be proximate to the second optical waveguide arm 120. The "ON" state occurs when electrical power is applied to the single diode (and in series to the single resistive heater). The "OFF" state occurs when no electrical power is applied to the single diode (and thus no current applied in series to the single resistive heater). In this configuration, elements 125, 690 may be omitted.

Figure 10:
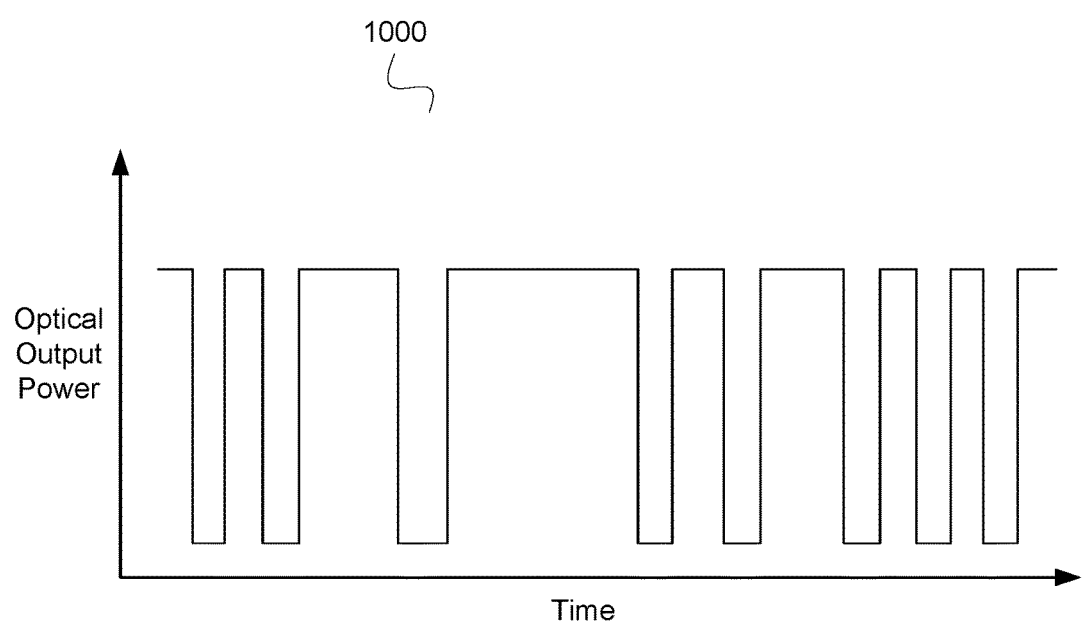
FIG. 10 illustrates, in a graph, a dependence of optical output power over time of an optical signal propagating through the carrier-effect based optical switch having resistive heaters.

FIG. 10 illustrates, in a graph, a dependence 1000 of optical output power over time of an optical signal propagating through the carrier-effect based optical switch 600 having resistive heaters RH1 680, RH2 690. The dependence 1000 shows that the self-heating is compensated which minimizes baseline drift, unlike the graph 500 of FIG. 5 which lacks the compensation. Thus, in FIG. 10, good ON/OFF extinction ratio is provided. The graph also demonstrates that the signal may support a frame sequence having a much longer hold time. FIG. 10 is an illustration only and is not intended to be to scale.

FIG. 11 illustrates, in a flowchart, an example of a method 1100 of operating a carrier-effect based optical switch, in this example the carrier-effect based optical switch 600 of FIGS. 6 and 7, having the resistive heater RH1 680. The method 1100 comprises applying a first electrical power to the first junction diode 115 disposed proximate to the first optical waveguide arm 110 of the carrier-effect based optical switch 600 (1110) for providing a first optical phase delay thereto due to at least a carrier-based effect. Next a second electrical power is applied to the first resistive heater RH1 680 disposed proximate to the second optical waveguide arm 120 of the carrier-effect based optical switch 600 (1120) for providing a second optical phase delay thereto due to a thermo-optic effect. The steps 1110 and 1120 may be performed simultaneously, or with a time delay that may be adjusted to optimize the overall temperature compensation. Other steps may be added to the method 1100 including applying a third electrical power to the second junction diode 125 disposed proximate to the second optical waveguide arm 120 in the carrier-effect based optical switch 600 for providing a third optical phase delay thereto due to at least a carrier-based effect, and applying a fourth electrical power to the second resistive heater RH2 690 disposed proximate to the first optical waveguide arm 110 in the carrier-effect based optical switch 600 for providing a fourth optical phase delay thereto due to a thermo-optic effect.

When the first junction diode 115 is electrically connected in series with the first resistive heater 680, then the second electrical power applied to the first resistive heater 680 (1120) may be due to the same current (i.e., common electrical current) that passed through the junction resistance of the first junction diode 115 then passing through the first resistive heater 680. Similarly, when the second junction diode 125 is electrically connected in series with the second resistive heater 690, then the fourth electrical power applied to the second resistive heater 690 may be due to the same current (i.e., common electrical current) that passed through the junction resistance of the second junction diode 125 then passing through the second resistive heater 690. When a separate power source provides the current for the junction diode 115,125 and the corresponding resistive heater 680, 690, then the electrical power applied to the resistive heater 680,690 may be adjusted relative to the electrical power applied to the junction resistance Rj1,Rj2 of the corresponding diode 115,125. Ideally, the amount of electrical power applied to first resistive heater 680 will cause the second waveguide arm 120 to increase in temperature the same amount (or close to the same amount) as the increase in temperature of the first waveguide arm 110 caused by the electrical power applied to the corresponding junction resistance Rj1. Thus, the temperature variation of the of the first waveguide arm 110 caused by the first junction diode 115 is at least partially offset by the temperature variation of the second waveguide arm 120 caused by the first resistive heater 680. Similarly, the amount of electrical power applied to second resistive heater 690 should be set to cause the first waveguide arm 110 to increase in temperature the same amount (or close to the same amount) as the increase in temperature of the second waveguide arm 120 caused by the electrical power applied to the corresponding junction resistance Rj2. Thus, the temperature variation of the of the second waveguide arm 120 caused by the second junction diode 125 is at least partially offset by the temperature variation of the first waveguide arm 110 caused by the second resistive heater 690.

The carrier-effect based optical switch 600 and method (1100) of operating a carrier-effect based optical switch 600 provide improved crosstalk and extinction ratio for switch matrices with carrier-effect based optical switch elements. The addition of the resistive heating elements is minimal and the added power consumption by the resistive heating elements is minimal. Some power may be dissipated on the compensating resistive heater which may increase the overall switch power consumption. However, since the change in temperature (ΔT) due to the junction diode is relatively small, the power consumption increase should also be relatively small.

In order to model and calculate of the amount of resistance needed by a resistance heater (RH), a starting point may be to consider the scenario where the resistance heater value equals the resistance of the intrinsic region under the forward bias (i.e., RH=Rs). By plotting the operation region on an current-voltage (I-V) curve of a PIN diode, the resistance of the junction region under forward bias (Rs) can be measured. Rs may depend on the forward current. The resistive heater may be designed such that it dissipates the same amount of power.

However, providing RH=Rs may not be optimal. The heating efficiency of a junction region may be different from that of the resistive heater. The volumetric heat generated in the junction region is inside the waveguide, making it very efficient. Preferably, the RH value is adjusted accordingly to take this factor into account. Thermal resistance of a junction region is typically lower than thermal resistance of a resistive heater, because the intrinsic-region (or junction region) is typically closer to the silicon substrate, which is the main path for heat dissipation. The RH value may be adjusted accordingly to compensate for this factor as well. Thus, similar currents or similar electrical powers in corresponding elements may be related in proportionality by this efficiency factor. In one embodiment, the targeted thermal time constant difference between the resistive heater and the junction region is zero.

Figure 12:
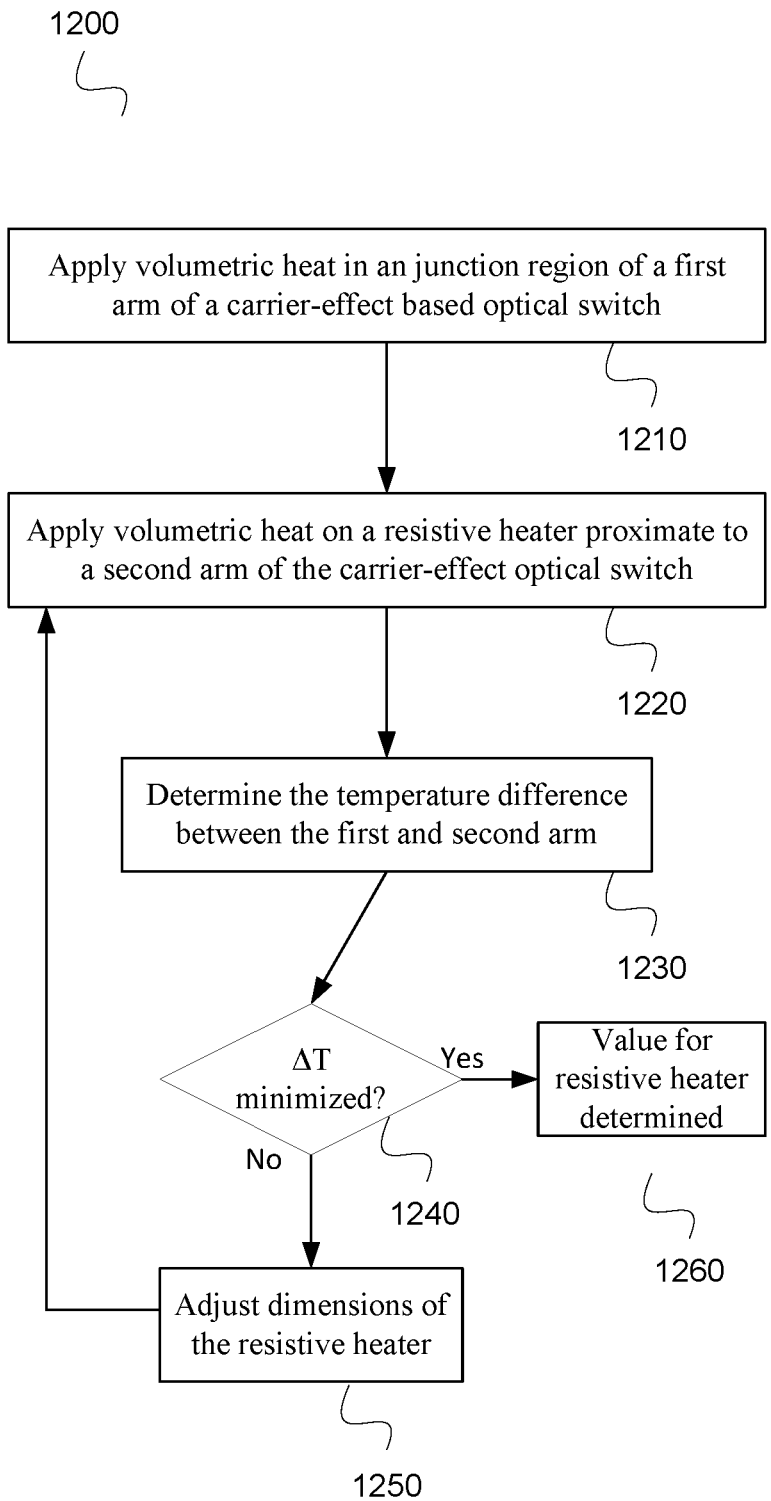
FIG. 12 illustrates, in a flowchart, a method of determining a steady-state value for a resistive heater in a carrier-effect based optical switch, in accordance with an embodiment of the present invention.

FIG. 12 illustrates, in a flowchart, a method 1200 of determining a steady-state value for a resistive heater in a carrier-effect based optical switch, in accordance with an embodiment of the present disclosure. The method 1200 (FIG. 12) includes applying volumetric heat to a first waveguide arm (i.e., the active arm) of a carrier-effect based optical switch (1210). The volumetric heat may come from a heat source (i.e., the junction resistance of the first junction diode corresponding to the first waveguide arm) when switching power Pit is applied to the first junction diode corresponding to the first waveguide arm. The temperature profile of the first waveguide arm and the second waveguide arm may be obtained from which the ΔT that needs to be compensated is identified.

Pπ is applied as volumetric heat on the resistive heater (1220) proximate to the second (passive) waveguide arm (i.e., electrical power is applied across the first resistive heater). Arbitrary or predicted dimensions of the resistive heater may be used initially. The temperature increase in the second waveguide arm ΔTv is observed. The temperature difference between the first (active) waveguide arm and the second (passive) waveguide arm is determined (1230). If the temperature difference is minimized (1240) (i.e., almost zero or at a level sufficient for a desired extinction ratio, e.g., better than 20 dB, or even better than 25 dB or even 30 dB) then the value of the first resistive heater (i.e., the value of a resistor that may be used as the first resistive heater) is determined (1260). Otherwise (1240), the dimensions (cross section) of the resistive heater may be adjusted (1250) and the temperature difference between the two arms re-measured (1230). The dimensions of the first resistive heater may be adjusted such that Pπ applied in both waveguide arms produces equal (or close to equal) temperatures at the waveguides in both arms of the carrier-effect based optical switch.

Other steps may be added to the method 1200, including adding the resistive heater material above the second waveguide arm. The design rules of the foundry should be followed and resistivity of the material is ideally well defined in the process. In push-pull carrier-effect based optical switches, the same process may be used for determining the value of a second resistive heater to add proximate to the first waveguide arm to compensate for the self-heating of the second waveguide arm caused by the junction resistance of the second junction diode.

The method 1100 of operating a carrier-effect based optical switch having a resistive heater, and certain steps of the method 1200 of determining a steady-state value for a resistive heater in a carrier-effect based optical switch, may be performed by a controller module on a remote or local server, or other remote or local device, that is communicatively connected to a power source that can apply the electrical power to the carrier-effect based optical switch 600. Additionally, the server or other device may also be communicatively connected to a light source that sends optical signals through the carrier-effect based optical switch 600. Furthermore, the server or other device may also be communicatively connected to heat sensors for measuring the temperature of the waveguide arms of the carrier-effect based optical switch 600.

Figure 13:
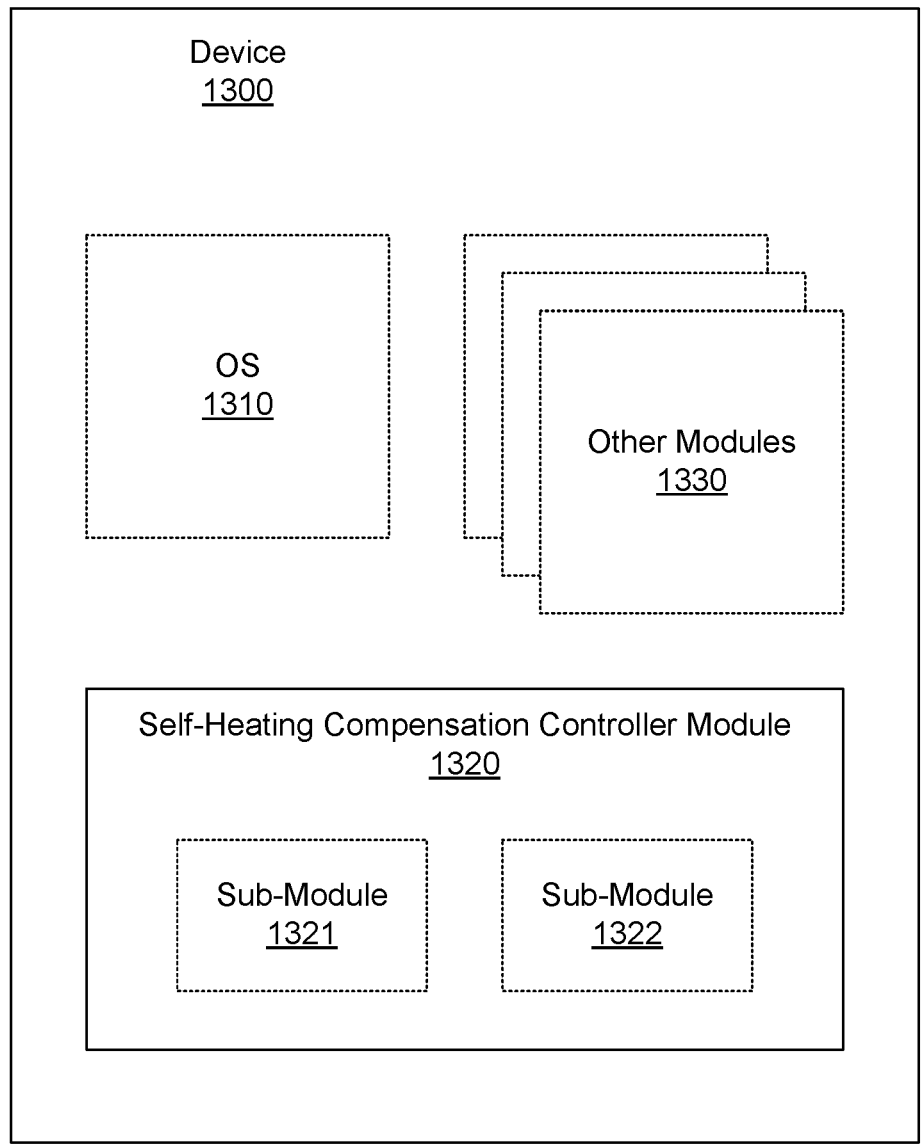
FIG. 13 illustrates, in a component diagram, an example of a device comprising a controller module for self-heating compensation, in accordance with embodiments of the methods described in FIGS. 11 and 12.

FIG. 13 illustrates, in a component diagram, an example of a device 1300 comprising a controller module for self-heating compensation 1320, in accordance with embodiments of the methods 1100 and 1200 described above. The device 1300 may further include an operating system 1310 and other modules 1330 for other functionalities of the device 1300. The module for managing self-heating compensation 1320 may include at least one of a sub-module 1321 for performing the method 1100 of operating a carrier-effect based optical switch described above, and a sub-module 1322 for performing certain steps of the method 1200 for determining a steady state value for a resistance heater in a carrier-effect based optical switch described above.

The controller module 1320 (or the sub-module 1321) may be configured to minimize the effect of self-heating in a carrier-effect based optical switch. The controller module 1320 (or the sub-module 1321) may comprise code which, when executed on a computing device, performs a method of operating a carrier-effect based optical switch. The controller module 1320 (or the sub-module 1321) may be configured to apply a first electrical power through a first junction diode 115 disposed proximate to a first optical waveguide arm 110 in the carrier-effect based optical switch for providing a first optical phase delay thereto due to at least a carrier-based effect. The controller module 1320 (or the sub-module 1321) may be configured to apply a second electrical power through a first resistive heater disposed proximate to a second optical waveguide arm in the carrier-effect based optical switch for providing a first optical phase delay thereto due to a thermo-optic effect. The controller module 1320 (or the sub-module 1321) applies a common electrical current to the first junction diode 115 and the first resistive heater 680 when these components are electrically connected in series. When the first junction diode 115 and the first resistive heater 680 comprise individual electrical inputs, the controller module 1320 (or the sub-module 1321) may independently apply electrical power to the first junction diode 115 and the first resistive heater 680 via corresponding independent electrical inputs thereof, such that a temperature variation of the first waveguide arm 110 caused by the first junction diode 115 is at least partially offset by a temperature variation of the second waveguide arm 120 caused by the first resistive heater 680.

The controller module 1320 (or the sub-module 1321) may further be configured to apply a third electrical power through a second junction diode 125 disposed proximate to the second optical waveguide arm 120 in the carrier-effect based optical switch for providing a third optical phase delay thereto due to at least a carrier-based effect, and to apply a fourth electrical power through a second resistive heater 690 disposed proximate to the first optical waveguide arm 110 in the carrier-effect based optical switch for providing a fourth optical phase delay thereto due to a thermo-optic effect. The controller module 1320 (or the sub-module 1321) applies a common electrical current to the second junction diode 125 and the second resistive heater 690 when these components are electrically connected in series. When the second junction diode 125 and the second resistive heater 690 comprise individual electrical inputs, the controller module 1320 (or the sub-module 1321) may independently apply electrical power to the second junction diode 125 and the second resistive heater 690 via corresponding independent electrical inputs thereof, such that a temperature variation of the second waveguide arm 120 caused by the second junction diode 125 is at least partially offset by a temperature variation of the first waveguide arm 110 caused by the first resistive heater 690.

Figure 14:
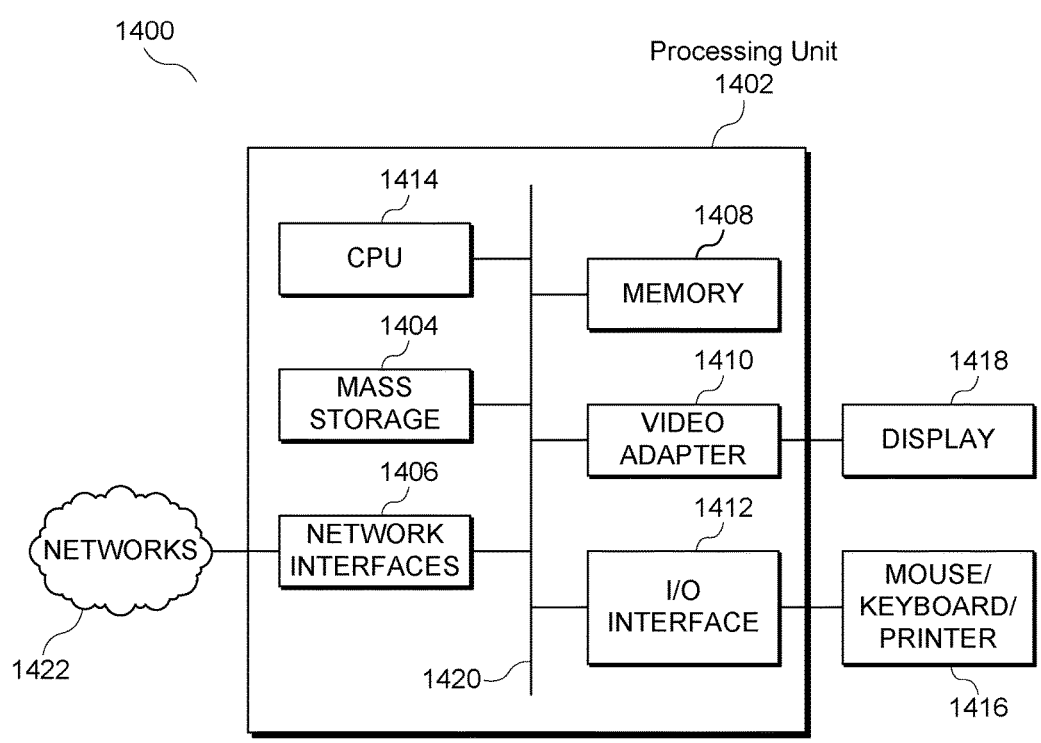
FIG. 14 illustrates, in a block diagram, a computing system that may be used for implementing the devices and methods disclosed herein.

FIG. 14 illustrates, in a block diagram, a computing system 1400 that may be used for implementing some of the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit 1402 includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. The memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse/keyboard/printer 1416 coupled to the I/O interface 1412. Other devices may be coupled to the processing unit 1402, and additional or fewer interface cards may be utilized. For example, a serial interface such as universal serial bus (USB) (not shown) may be used to provide an interface for an external device.

The processing unit 1402 may also include one or more network interfaces 1406, which may comprise wired links, such as an Ethernet cable, and/or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. The processing unit 1402 may be coupled to a local-area network 1422 or a wide-area network for data processing and communications with remote devices, such as other processing units, the Internet, or remote storage facilities.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A carrier-effect based optical switch comprising:
   input and output optical couplers;
   first and second optical waveguide arms each connecting the input optical coupler to the output optical coupler;
   a first junction diode proximate to the first optical waveguide arm for providing a first optical phase delay thereto due to at least a carrier-based effect; and
   a first resistive heater proximate to the second optical waveguide arm for providing a second optical phase delay thereto due to a thermo-optic effect,
   wherein the first optical phase delay comprises a thermo-optic portion due to the thermo-optic effect and a carrier-based portion due to the carrier-based effect, and wherein the optical switch is configured to dynamically adjust power applied to the first resistive heater relative to power applied to the first junction diode in order to cause the second optical phase delay to approximately match the thermo-optic portion of the first optical phase delay.

2. A carrier-effect based optical switch comprising:
   input and output optical couplers;
   first and second optical waveguide arms each connecting the input optical coupler to the output optical coupler;

a first junction diode proximate to the first optical waveguide arm for providing a first optical phase delay thereto due to at least a carrier-based effect; and a first resistive heater proximate to the second optical waveguide arm for providing a second optical phase delay thereto due to a thermo-optic effect, wherein the first optical phase delay comprises a thermo-optic portion due to the thermo-optic effect and a carrier-based portion due to the carrier-based effect, and wherein the first resistive heater is configured to provide the second phase delay so as to at least partially offset the thermo-optic portion of the first optical phase delay, and wherein the first resistive heater is electrically connected in series with the first junction diode.

3. The carrier-effect based optical switch as claimed in claim 1, wherein the first junction diode and the first resistive heater comprise individual electrical inputs, the carrier-effect based optical switch further comprising electronic circuitry for independently applying electrical power to the first junction diode and the first resistive heater via the corresponding individual electrical inputs thereof, such that a temperature variation of the first waveguide arm caused by the first junction diode is at least partially offset by a temperature variation of the second waveguide arm caused by the first resistive heater.

4. The carrier-effect based optical switch as claimed in claim 1, further comprising:
a second junction diode proximate to the second optical waveguide arm for providing a third optical phase delay thereto due to at least a carrier-based effect; and
a second resistive heater proximate to the first optical waveguide arm for providing a fourth optical phase delay thereto due to a thermo-optic effect.

5. The carrier-effect based optical switch as claimed in claim 4, wherein the third optical phase delay comprises a thermo-optic portion due to the thermo-optic effect and a carrier-based portion due to the carrier-based effect, and wherein the optical switch is further configured to dynamically adjust power applied to the second resistive heater relative to power applied to the second junction diode in order to cause the fourth optical phase delay to approximately match the thermo-optic portion of the third optical phase delay.

6. The carrier-effect based optical switch as claimed in claim 2, further comprising:
a second junction diode proximate to the second optical waveguide arm for providing a third optical phase delay thereto due to at least a carrier-based effect; and
a second resistive heater proximate to the first optical waveguide arm for providing a fourth optical phase delay thereto due to a thermo-optic effect,
wherein the second resistive heater is electrically connected in series with the second junction diode.

7. The carrier-effect based optical switch as claimed in claim 5, wherein the second junction diode and the second resistive heater comprise individual electrical inputs, the carrier-effect based optical switch further comprising electronic circuitry configured for independently applying electrical power to the second junction diode and the second resistive heater via the corresponding individual electrical inputs thereof, such that a temperature variation of the second waveguide arm caused by the second junction diode is at least partially offset by a temperature variation of the first waveguide arm caused by the second resistive heater.

8. A method of operating a carrier-effect based optical switch, the method comprising:

applying a first electrical power to a first junction diode disposed proximate to a first optical waveguide arm of the carrier-effect based optical switch for providing a first optical phase delay thereto due to at least a carrier-based effect; and applying a second electrical power to a first resistive heater disposed proximate to a second optical waveguide arm of the carrier-effect based optical switch for providing a second optical phase delay thereto due to a thermo-optic effect, wherein the first optical phase delay comprises a thermo-optic portion due to the thermo-optic effect and a carrier-based portion due to the carrier-based effect, and wherein the method further comprises dynamically adjusting the second electrical power relative to the first electrical power in order to to cause the second optical phase delay to approximately match the thermo-optic portion of the first optical phase delay.

9. A method of operating a carrier-effect based optical switch, the method comprising:

applying a first electrical power to a first junction diode disposed proximate to a first optical waveguide arm of the carrier-effect based optical switch for providing a first optical phase delay thereto due to at least a carrier-based effect; and applying a second electrical power to a first resistive heater disposed proximate to a second optical waveguide arm of the carrier-effect based optical switch for providing a second optical phase delay thereto due to a thermo-optic effect, the method further comprising electrically connecting the first resistive heater in series with the first junction diode, and applying a common electrical current to the first junction diode and the first resistive heater.

10. The method as claimed in claim 8, further comprising independently applying electrical power to the first junction diode and the first resistive heater such that a temperature variation of the first waveguide arm caused by the first junction diode is at least partially offset by a temperature variation of the second waveguide arm caused by the first resistive heater.

11. The method as claimed in claim 8, further comprising:
applying a third electrical power to a second junction diode disposed proximate to the second optical waveguide arm for providing a third optical phase delay thereto due to at least a carrier-based effect; and
applying a fourth electrical power to a second resistive heater disposed proximate to the first optical waveguide arm for providing a fourth optical phase delay thereto due to a thermo-optic effect.

12. The method as claimed in claim 9, further comprising:
applying a third electrical power to a second junction diode disposed proximate to the second optical waveguide arm for providing a third optical phase delay thereto due to at least a carrier-based effect;
applying a fourth electrical power to a second resistive heater disposed proximate to the first optical waveguide arm for providing a fourth optical phase delay thereto due to a thermo-optic effect;
electrically connecting the second resistive heater in series to the second junction diode, and applying a common electrical current to the second junction diode and the second resistive heater.

13. The method as claimed in claim 11, further comprising independently applying electrical power to the second junction diode and the second resistive heater such that a temperature variation of the second waveguide arm caused by the second junction diode is at least partially offset by a temperature variation of the first waveguide arm caused by the second resistive heater.

14. A controller module for controlling a carrier-effect based optical switch, the controller module comprising code which, when executed on a computing device, causes the controller module to:
- apply a first electrical power to a first junction diode disposed proximate to a first optical waveguide arm of the carrier-effect based optical switch for providing a first optical phase delay thereto due to at least a carrier-based effect; and
- apply a second electrical power to a first resistive heater disposed proximate to a second optical waveguide arm of the carrier-effect based optical switch for providing a second optical phase delay thereto due to a thermo-optic effect,
- wherein the first optical phase delay comprises a thermo-optic portion due to the thermo-optic effect and a carrier-based portion due to the carrier-based effect, and wherein the controller module is further configured to dynamically adjust the second electrical power relative to the first electrical power in order to cause the second optical phase delay to approximately match the thermo-optic portion of the first optical phase delay.

15. A controller module for controlling a carrier-effect based optical switch, the controller module comprising code which, when executed on a computing device, causes the controller module to:
- apply a first electrical power to a first junction diode disposed proximate to a first optical waveguide arm of the carrier-effect based optical switch for providing a first optical phase delay thereto due to at least a carrier-based effect; and
- apply a second electrical power to a first resistive heater disposed proximate to a second optical waveguide arm of the carrier-effect based optical switch for providing a second optical phase delay thereto due to a thermo-optic effect,
- wherein the first resistive heater is connected in series with the first junction diode, and wherein the code further causes the controller module to apply a common electrical current to the first junction diode and the first resistive heater.

16. The controller module as claimed in claim 14, wherein the first junction diode and the first resistive heater comprise individual electrical inputs, and wherein the code further causes the controller to independently apply electrical power to the first junction diode and the first resistive heater via corresponding independent electrical inputs thereof, such that a temperature variation of the first waveguide arm caused by the first junction diode is at least partially offset by a temperature variation of the second waveguide arm caused by the first resistive heater.

17. The controller module as claimed in claim 14, wherein the code causes further causes the controller to:
- apply a third electrical power to a second junction diode disposed proximate to the second optical waveguide arm for providing a fourth optical phase delay thereto due to at least a carrier-based effect; and
- apply fourth electrical power to a second resistive heater disposed proximate to the first optical waveguide arm for providing a fourth optical phase delay thereto due to a thermo-optic effect.

18. The controller module as claimed in claim 15, wherein the code causes further causes the controller to:
- apply a third electrical power to a second junction diode disposed proximate to the second optical waveguide arm for providing a fourth optical phase delay thereto due to at least a carrier-based effect; and
- apply fourth electrical power to a second resistive heater disposed proximate to the first optical waveguide arm for providing a fourth optical phase delay thereto due to a thermo-optic effect, and
- wherein the second resistive heater is connected in series with the second junction diode, and wherein the code further causes the controller to apply a common electrical current to the second junction diode and the second resistive heater.

19. The controller module as claimed in claim 17, wherein the second junction diode and the second resistive heater comprise individual electrical inputs, and wherein the code further causes the controller to independently apply electrical power to the second junction diode and the second resistive heater such that a temperature variation of the second waveguide arm caused by the second junction diode is at least partially offset by a temperature variation of the first waveguide arm caused by the second resistive heater.

* * * * *

UNITED STATES PATENT AND TRADEMARK OFFICE
CERTIFICATE OF CORRECTION

PATENT NO. : 10,353,267 B2
APPLICATION NO. : 15/395570
DATED : May 31, 2016
INVENTOR(S) : Dritan Celo and Dominic John Goodwill It is certified that error appears in the above-identified patent and that said Letters Patent is hereby corrected as shown below:

In the Specification

Column 11, Line 39:
"switching power Pit is applied to the first junction diode"
Should read:
-- switching power $P\pi$ is applied to the first junction diode --

Signed and Sealed this
Third Day of December, 2019

Andrei Iancu
*Director of the United States Patent and Trademark Office*